United States Patent
Rogers

(10) Patent No.: US 8,400,569 B2
(45) Date of Patent: Mar. 19, 2013

(54) VIDEO SYSTEM AND METHOD SUPPORTING DISPLAY OF DIFFERENT SIZE PICTURES

(75) Inventor: Landis Rogers, Kingston, NH (US)

(73) Assignee: Broadcom Corporation, Irvine, CA (US)

(*) Notice: Subject to any disclaimer, the term of this patent is extended or adjusted under 35 U.S.C. 154(b) by 1766 days.

(21) Appl. No.: 11/000,657

(22) Filed: Nov. 30, 2004

(65) Prior Publication Data

US 2006/0114316 A1    Jun. 1, 2006

(51) Int. Cl.
*H04N 3/24*    (2006.01)
*H04N 7/14*    (2006.01)

(52) U.S. Cl. .................................. 348/634; 348/14.12

(58) Field of Classification Search ............. 348/14.12, 348/634, 469, 384.1, 390.1, 425.1, 458, 581, 348/913, 556, 445; 382/299–302
See application file for complete search history.

(56) References Cited

U.S. PATENT DOCUMENTS

| | | | | |
|---|---|---|---|---|
| 3,752,911 A * | 8/1973 | Morchand et al. | ......... | 348/426.1 |
| 4,672,444 A * | 6/1987 | Bergen et al. | .................. | 348/441 |
| 4,876,598 A * | 10/1989 | Carlstedt et al. | .............. | 348/572 |
| 5,047,868 A * | 9/1991 | Takeda et al. | .................. | 386/109 |
| 5,075,773 A * | 12/1991 | Pullen et al. | ............. | 375/240.01 |
| 5,262,855 A * | 11/1993 | Alattar et al. | ............ | 375/240.21 |
| 5,270,831 A * | 12/1993 | Parulski et al. | ................ | 358/403 |
| 5,299,007 A * | 3/1994 | Saeger et al. | ................. | 348/503 |
| 5,345,270 A * | 9/1994 | Saeger et al. | ............... | 348/435.1 |
| 5,412,766 A * | 5/1995 | Pietras et al. | ................. | 345/602 |
| 5,675,389 A * | 10/1997 | Oda | .............................. | 348/468 |
| 5,734,436 A * | 3/1998 | Abe et al. | ....................... | 348/564 |
| 5,757,910 A * | 5/1998 | Rim | ............................ | 380/203 |
| 5,771,073 A * | 6/1998 | Lim | ........................... | 348/390.1 |
| 6,040,871 A * | 3/2000 | Andersson | ..................... | 348/510 |
| 6,246,442 B1 * | 6/2001 | Harada et al. | ................. | 348/569 |
| 6,661,448 B2 * | 12/2003 | Lunden | ...................... | 348/14.02 |
| 6,670,964 B1 * | 12/2003 | Ward et al. | .................... | 345/660 |
| 7,017,075 B1 * | 3/2006 | Peters | ............................ | 714/15 |
| 7,113,200 B2 * | 9/2006 | Eshkoli | ...................... | 348/14.07 |
| 2002/0130973 A1 * | 9/2002 | Levandowski | ................ | 348/588 |

* cited by examiner

*Primary Examiner* — Victor Kostak

(74) *Attorney, Agent, or Firm* — Thomas|Horstemeyer, LLP.

(57) ABSTRACT

Presented herein are system(s), method(s), and apparatus for dynamic blanking. In one embodiment, there is presented a method. The method comprises generating blank lines forming a portion of a larger picture if a picture is not available, until the picture is available; and including the picture in the larger picture when the larger picture is available.

16 Claims, 3 Drawing Sheets

VIDEO SYSTEM AND METHOD SUPPORTING DISPLAY OF DIFFERENT SIZE PICTURES

PRIORITY CLAIM

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

During a video conference, a decoder system receives streams of pictures that can include pictures of varying sizes. Due to the amount of data in a picture, the pictures are often encoded in accordance with any one of a variety of standards. These standards can include, but are not limited to, MPEG-2, H.264, and VC-1, to name a few.

Because of the different sizes of the pictures, different amounts of time are required to decode the pictures. Additionally, same size pictures can take different amounts of time to decode, as well. For example, in MPEG-2, bi-directionally encoded pictures can take longer to decode than intra-coded pictures.

After the pictures are decoded, the pictures are postprocessed for display and provided to a formatter. The formatter arranges the pictures for the video conference. Due to the varying amounts of time required to decode pictures, a postprocessor can finish postprocessing a picture, before the decoder finishes decoding the next picture for postprocessing. During this time, the postprocessor provides a blank picture to the formatter. This can slow down the picture rate, reducing the quality of the video conference.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Presented herein are system(s), method(s), and apparatus for dynamic blanking.

In one embodiment, there is presented a method. The method comprises generating blank lines forming a portion of a larger picture if a picture is not available, until the picture is available; and including the picture in the larger picture when the larger picture is available.

In another embodiment, there is presented a decoder system comprising a postprocessor for generating blank lines forming a portion of a larger picture if a picture is not available, until the picture is available, and including the picture in the larger picture when the larger picture is available.

In another embodiment, there is presented a circuit. The circuit comprises memory and a processor. The memory stores a plurality of instructions. Execution of the instructions causes generating blank lines forming a portion of a larger picture if a picture is not available until the picture is available; and including the picture in the larger picture when the larger picture is available. The processor is connected to the memory and operable to execution the instructions.

These and other advantages and novel features of the present invention, as well as details of an illustrated embodiment thereof, will be more fully understood from the following description and drawings.

DETAILED DESCRIPTION OF THE INVENTION

Figure 1:
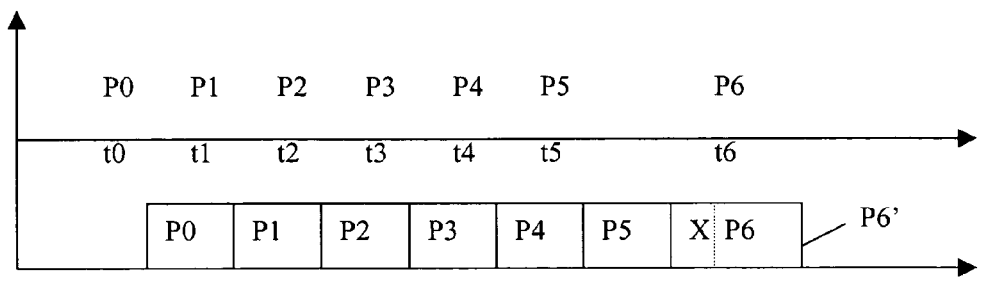
FIG. 1 is a block diagram of an exemplary stream of pictures.

Referring now to FIG. 1, there is illustrated a block diagram describing an exemplary stream of pictures P0 . . . P6. The pictures P0 . . . P6 are provided corresponding times t0 . . . t6. The pictures P0 . . . P6 are then processed for display. The pictures P0 . . . P6 can initially be encoded in accordance with any of a variety of encoding standards, including, but not limited to, MPEG-2, or H.264, to name a few.

The pictures P0 . . . P6 can also be of a variety of sizes and shapes. For example, the pictures P0 . . . P6 can represent pictures for a video conference. In cases where pictures P0 . . . P6 have different sizes, the pictures P0 . . . P6 can take different amounts of time to decode. For example, a larger picture, e.g., P6 can take a longer time to decode than pictures P0 . . . P5.

Due to the different times for decoding pictures P0 . . . P6, it is possible that picture P5 can be processed for display, prior to decoding picture P6. Therefore, picture P6 is not available for display when the processing of picture P5 for display is finished.

When the picture P6 is not available for display a larger picture P6' is generated. The larger picture P6' is filled with blank lines X until picture P6 is available. When picture P6 is available, it is included in the larger picture P6'.

Figure 2:
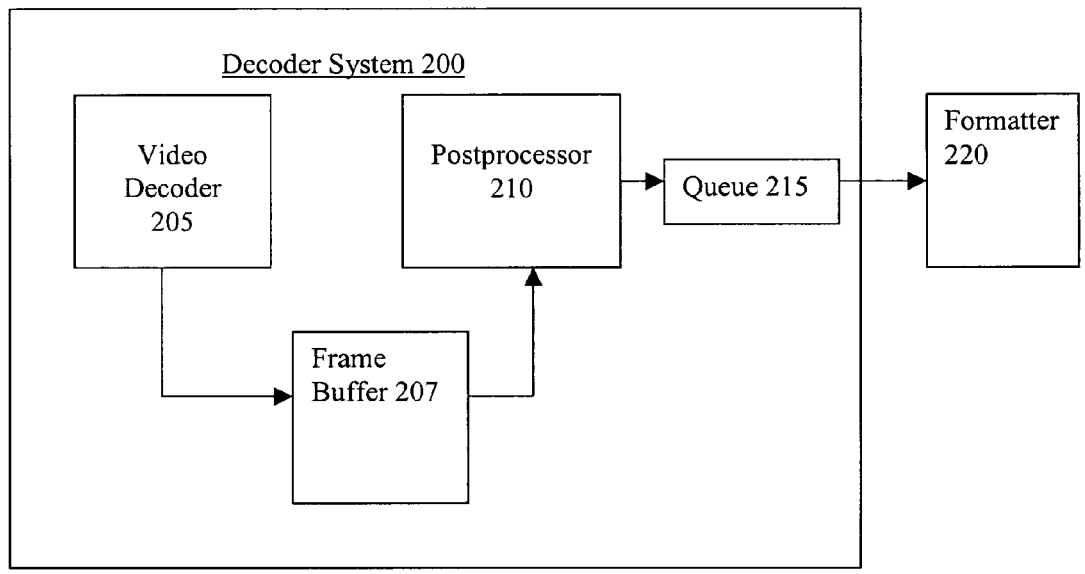
FIG. 2 is a block diagram of an exemplary decoder system in accordance with an embodiment of the present invention.

Referring now to FIG. 2, there is illustrated a block diagram of an exemplary decoder system 200 in accordance with an embodiment of the present invention. The decoder system 200 includes a video decoder 205, frame buffer 207, a postprocessor 210, and a queue 215.

The video decoder 205 decodes the pictures P0 . . . P6, and writes the pictures to frame buffers 207. The postprocessor 210 processes the decoded pictures P0 . . . P6 for display. Upon processing the pictures P0 . . . P6, the postprocessor 210 places the pictures in the queue 215. The decoder system 200 can be connected to a video conference formatter 220. The video conference formatter 220 displays the pictures P0 . . . P6.

When the picture P6 is not available for display, postprocessor 210 generates a larger picture P6'. The postprocessor 210 fills the larger picture P6' with blank lines until picture P6 is available. When the video decoder 205 makes picture P6 available, the postprocessor 210 includes picture P6 in the larger picture P6'. The video conference formatter 220 is capable of removing blank lines from the larger picture P6', and displaying only P6.

Figure 3:
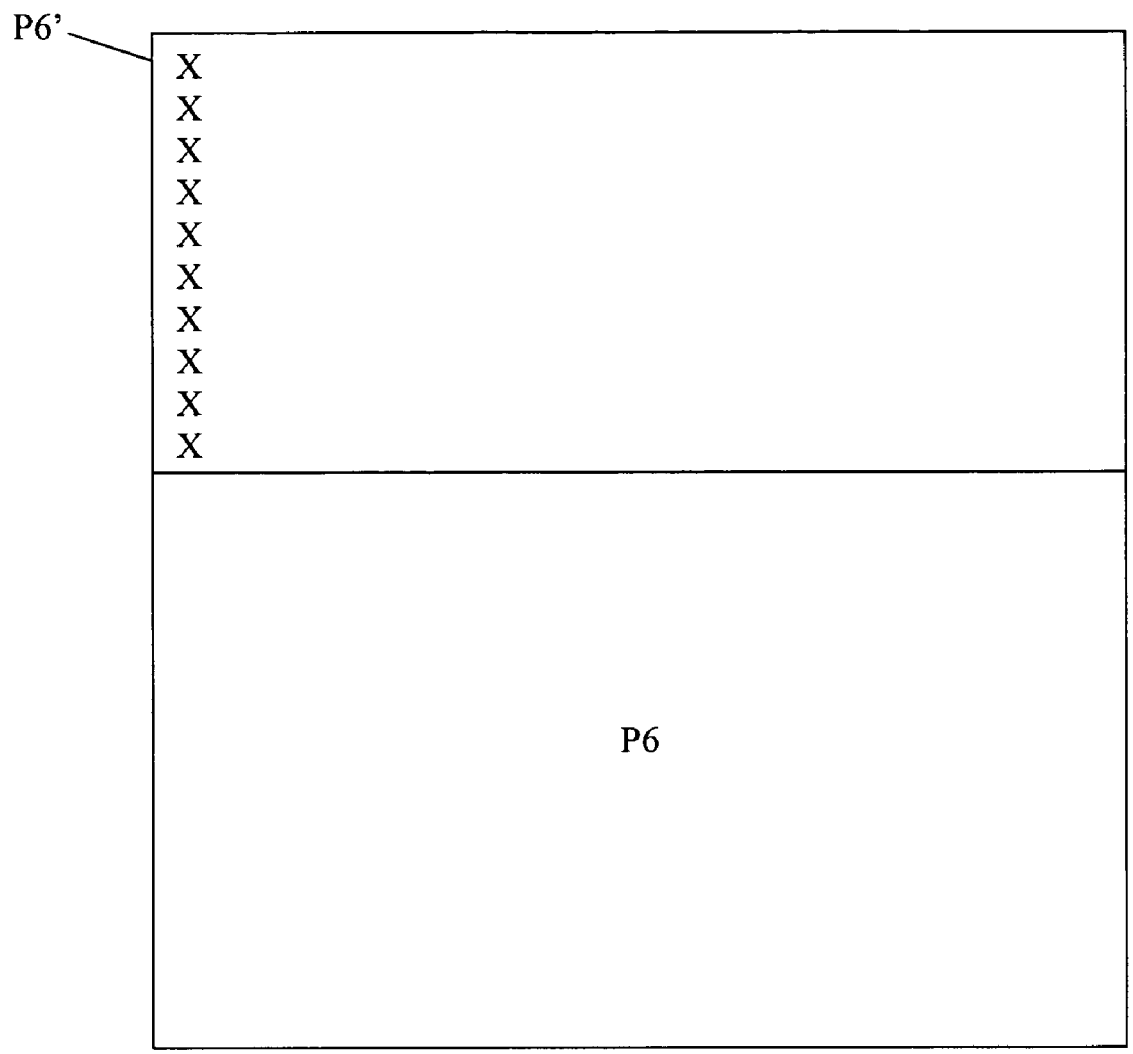
FIG. 3 is a block diagram of an exemplary picture generated in accordance with an embodiment of the present invention.

Referring now to FIG. 3, there is illustrated a block diagram describing an exemplary larger picture P6' in accordance with an embodiment of the present invention. The exemplary larger picture P6' comprises blank lines X at the top of the picture P6', and the picture P6 at the bottom of the picture. After postprocessing picture P5, if the picture P6 is not available, the postprocessor 210 generates the blank lines X until picture P6 is available.

The term "blank lines" shall include any lines of pixels that are independent of the picture P6. This can include, but is not limited to, black lines, white lines, or lines with a predetermined sequence of pixels.

Figure 4:
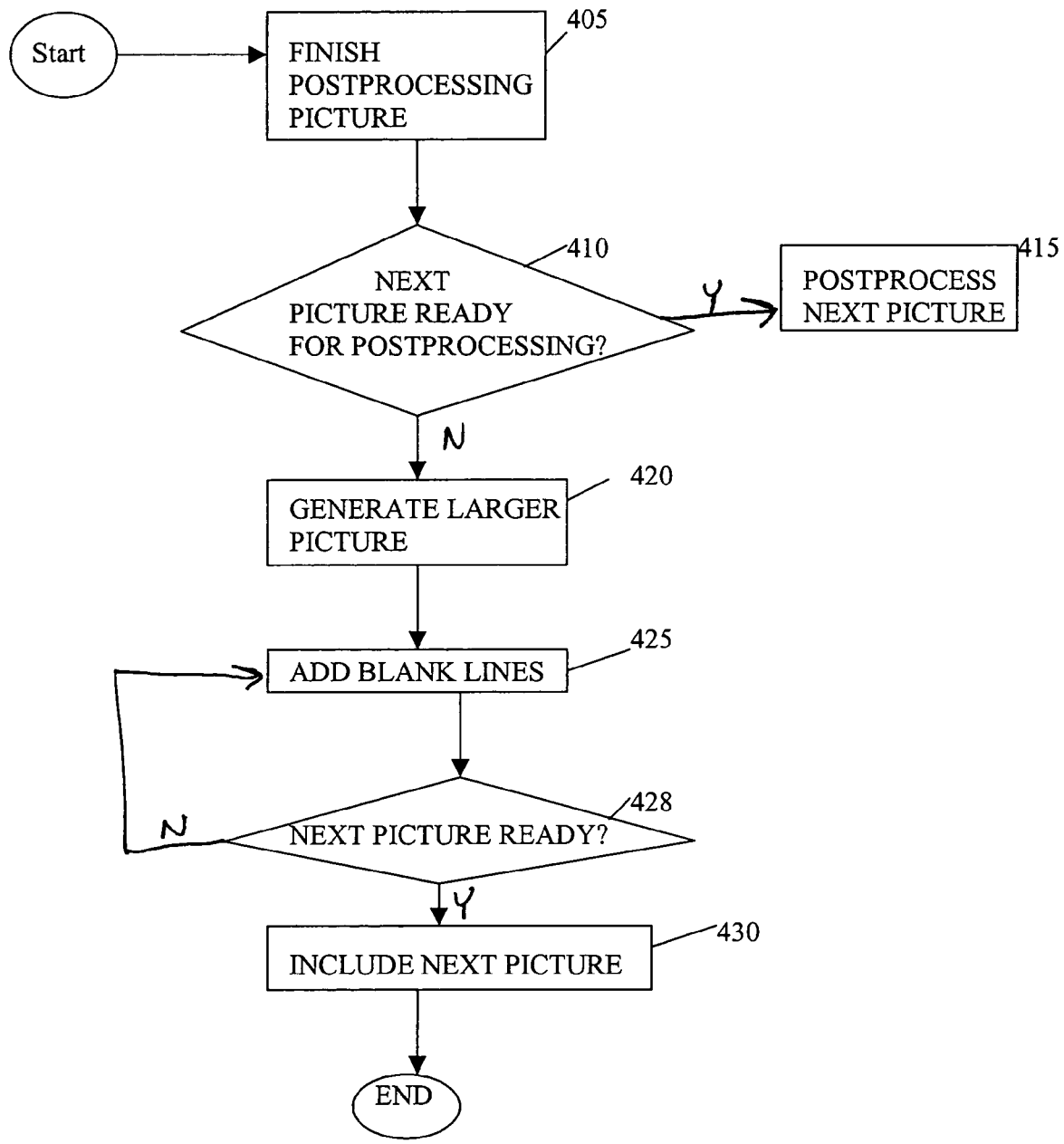
FIG. 4 is a flow diagram for generating pictures in accordance with an embodiment of the present invention.

Referring now to FIG. 4, there is illustrated a flow diagram for displaying pictures. At 405, the postprocessor 210 finishes processing a picture. At 410, the postprocessor 210 determines whether the next picture is ready for postprocessing.

When the next picture is ready for postprocessing at 410, the postprocessor 210 postprocesses the next picture P6 at 415, and 410 is repeated.

When the next picture is not ready for postprocessing at 410, the postprocessor 210 generates a larger picture P6' at 420. At 425, the postprocessor 210 adds blank lines to the larger picture P6'. The postprocessor 210 repeats the foregoing until the next picture P6 is ready for postprocessing at 425. When the next picture P6 is ready for postprocessing at 425, the postprocessor 210 adds picture P6 to the larger picture P6' at 430. After 430, 410 is repeated.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware. In one embodiment, a deinterlacer can be incorporated into a single integrated circuit.

Although the embodiments described herein are described with a degree of particularity, it should be noted that changes, substitutions, and modifications can be made with respected to the embodiments without departing from the spirit and scope of the present application. Accordingly, the present application is only limited by the following claims and equivalents thereof.

The invention claimed is:

1. A method comprising:
   generating blank lines forming a portion of a larger picture if a picture is not available, until the picture is available; and
   including the picture in its entirety in the larger picture with the generated blank lines when the picture in its entirety is available.

2. The method of claim 1, further comprising:
   decoding the picture.

3. The method of claim 2, wherein the blank lines are generated before the picture is decoded, and wherein the picture is included in the larger picture after the picture is decoded.

4. The method of claim 1, further comprising:
   placing the larger picture in a queue.

5. The method of claim 1 further comprising removing the generated blank lines from the larger picture after the picture in its entirety is included in the larger picture.

6. A decoder system comprising:
   a postprocessor for generating blank lines forming a portion of a larger picture if a picture is not available, until the picture is available, and including the picture in its entirety in the larger picture with the generated blank lines when the picture in its entirety is available.

7. The decoder system of claim 6, further comprising:
   a decoder for decoding the picture.

8. The decoder system of claim 7, wherein the post processor generates the blank lines before the decoder finishes decoding the picture, and wherein the picture is included in the larger picture after the decoder finishes decoding the picture.

9. The decoder system of claim 7, further comprising:
   at least one frame buffer for storing the picture after the decoder decodes the picture.

10. The decoder system of claim 6, further comprising:
    a queue for providing the larger picture for display.

11. The decoder system of claim 6, further comprising a formatter configured to remove the generated blank lines from the larger picture after the picture in its entirety is included in the larger picture.

12. A circuit comprising:
    a memory storing a plurality of instructions, wherein execution of the instructions causes:
       generating blank lines forming a portion of a larger picture if a picture is not available, until the picture is available; and
       including the picture in its entirety in the larger picture with the generated blank lines when the picture in its entirety is available; and
    a processor connected to the memory, the processor operable to execute the instructions.

13. The circuit of claim 12, wherein execution of the instructions also causes:
    decoding the picture.

14. The circuit of claim 13, wherein the blank lines are generated before the picture is decoded, and wherein the picture is included in the larger picture after the picture is decoded.

15. The circuit of claim 12, wherein execution of the instructions also causes:
    placing the larger picture in a queue.

16. The circuit of claim 12, wherein the execution of the instructions causes removing the generated blank lines from the larger picture after the picture in its entirety is included in the larger picture.

* * * * *